(12) United States Patent
Zguris et al.

(10) Patent No.: US 6,531,248 B1
(45) Date of Patent: Mar. 11, 2003

(54) BATTERY PASTE

(75) Inventors: George C. Zguris, Canterbury, NH (US); Antonio L. Ferreira, Nashua, NH (US)

(73) Assignee: Squannacook Technologies LLC, East Walpole, MA (US)

( * ) Notice: Subject to any disclaimer, the term of this patent is extended or adjusted under 35 U.S.C. 154(b) by 134 days.

(21) Appl. No.: 09/672,883

(22) Filed: Sep. 28, 2000

Related U.S. Application Data (63) Continuation-in-part of application No. 09/413,344, filed on Oct. 6, 1999, now abandoned.

(51) Int. Cl.$^7$ ................................................. H01H 4/20
(52) U.S. Cl. ....................................... 429/225; 429/232
(58) Field of Search ................................ 429/225, 232; 252/182.1

(56) References Cited

U.S. PATENT DOCUMENTS

| | | | |
|---|---|---|---|
| 2,107,937 A | * | 2/1938 | Hall ........................ 252/182.1 |
| 2,564,707 A | | 8/1951 | Mochel |

(List continued on next page.)

FOREIGN PATENT DOCUMENTS

| | | |
|---|---|---|
| DE | 3532697 | 4/1987 |
| EP | 0 127 301 | 12/1984 |

(List continued on next page.)

OTHER PUBLICATIONS

U.S. patent application publication No. 2001/0016287.
U.S. patent application publication No. 2001/0016288.
U.S. patent application publication No. 2001/0042288.

Vinal, GW.et al., "Note on the Effects of Cobalt and Nickle in Storage Batteries", *Journal of Research of the National Bureau Of Standards* vol. 25, pp. 417–420; 1940.

Williams, FJ. et al., "Lead–Nickel Glass of controlled Chemical Durability for Storage Battery Use" *Journa of the American Ceramic Society* vol. 29, pp. 313–316; 1946.

*Primary Examiner*—Carol Chaney
(74) *Attorney, Agent, or Firm*—Fish & Richardson P.C.

(57) ABSTRACT

A battery paste is disclosed. One such paste consists essentially of at least one lead oxide (i.e., an uncalcined oxide of lead) and at least one lead oxide sulfate, sufficient water to moisten the paste, and from 0.02 percent to 15 percent based on the weight of the lead oxide plus the weight of the lead oxide sulfate, calculated as the lead oxide, of glass fibers having an average diameter not greater than 15 micron. Another paste consists essentially of at least one lead oxide and at least one lead oxide sulfate, sufficient water to moisten the paste, and from 1 percent to 15 percent based on the weight of the lead oxide plus the weight of the lead oxide sulfate, calculated as the lead oxide, of glass fibers of a specific composition that enables specific beneficial ions to diffuse into the paste during the life of the battery.

A method for producing such a battery paste and a delivery system for adding the additives that are added into the paste is also disclosed. The method comprises charging a part of the water and a part of the special composition glass fibers desired in the paste to a mechanical mixer, mixing the water and fibers, adding the lead oxide or oxides desired in the paste to the mixer, mixing the water, glass fibers and lead oxide or oxides until essentially all of the free water in the mixer has been mixed with the lead oxide or oxides, adding the rest of the water required to moisten the paste to the desired consistency and the sulfuric acid required to form the lead oxide sulfate or sulfates, and mixing the paste.

The delivery system is the charging to a paste batch of a glass fiber mat that has been impregnated with the other required additives in such a proportion that a certain size/weight of the mat provides all the additional ingredients.

15 Claims, 3 Drawing Sheets

U.S. PATENT DOCUMENTS

| | | |
|---|---|---|
| 4,039,730 A | 8/1977 | Brinkmann et al. |
| 4,046,539 A | 9/1977 | Pitt |
| 4,119,772 A | 10/1978 | Peters et al. |
| 4,188,268 A | 2/1980 | Sugahara et al. |
| 4,230,779 A | 10/1980 | Varma |
| 4,315,829 A | 2/1982 | Duddy et al. |
| 4,323,470 A * | 4/1982 | Mahato et al. ........... 252/182.1 |
| 4,336,314 A | 6/1982 | Yonezu et al. |
| 4,353,969 A | 10/1982 | Rippel et al. |
| 4,391,036 A | 7/1983 | Kishimoto et al. |
| 4,414,295 A | 11/1983 | Uba |
| 4,414,297 A | 11/1983 | Fischer |
| 4,507,372 A | 3/1985 | Rowlette |
| 4,510,219 A | 4/1985 | Rowlette |
| 4,510,252 A | 4/1985 | Potter |
| 4,588,015 A | 5/1986 | Liebermann |
| 4,606,982 A | 8/1986 | Nelson et al. |
| 4,627,868 A | 12/1986 | Kaveh |
| 4,631,241 A | 12/1986 | Kawanami |
| 4,725,516 A | 2/1988 | Okada et al. |
| 4,735,870 A | 4/1988 | Rowlette |
| 4,787,125 A | 11/1988 | Pinsky et al. |
| 4,861,689 A | 8/1989 | Clough et al. |
| 4,865,933 A | 9/1989 | Blanyer et al. |
| 4,873,161 A | 10/1989 | Rippel et al. |
| 4,909,955 A | 3/1990 | Morris et al. |
| 5,009,971 A | 4/1991 | Johnson et al. |
| 5,035,966 A | 7/1991 | Tokunaga et al. |
| 5,075,184 A | 12/1991 | Tanaka et al. |
| 5,076,826 A | 12/1991 | Teeter |
| 5,114,806 A | 5/1992 | Chiacchio et al. |
| 5,126,218 A | 6/1992 | Clarke |
| 5,182,165 A | 1/1993 | Clough et al. |
| 5,204,140 A | 4/1993 | Grosvenor et al. |
| 5,206,100 A | 4/1993 | Muto et al. |
| 5,219,676 A | 6/1993 | Bullock et al. |
| 5,223,352 A | 6/1993 | Pitts et al. |
| 5,225,298 A | 7/1993 | Nakayama et al. |
| 5,302,476 A * | 4/1994 | Kao et al. ................... 429/225 |
| 5,336,275 A | 8/1994 | Zguris et al. |
| 5,348,817 A | 9/1994 | Rao et al. |
| 5,368,960 A | 11/1994 | Rowlette |
| 5,368,961 A | 11/1994 | Juergens |
| 5,376,479 A | 12/1994 | Gerner |
| 5,449,574 A | 9/1995 | Higley |
| 5,468,572 A | 11/1995 | Zguris et al. |
| 5,474,863 A | 12/1995 | Yamamoto |
| 5,547,783 A | 8/1996 | Funato et al. |
| 5,645,959 A | 7/1997 | Rowlette |
| 5,660,949 A | 8/1997 | Lajeunesse |
| 5,667,917 A | 9/1997 | Edwards et al. |
| 5,677,078 A | 10/1997 | Juergens et al. |
| 5,705,265 A | 1/1998 | Clough et al. |
| 5,759,716 A | 6/1998 | Clough |
| 5,766,789 A | 6/1998 | James et al. |
| 5,800,946 A | 9/1998 | Grosvenor et al. |
| 5,820,639 A | 10/1998 | Snyder et al. |
| 5,895,732 A | 4/1999 | Clough |
| 5,925,470 A | 7/1999 | Blanyer et al. |
| 5,998,062 A | 12/1999 | Olson |
| 6,004,689 A | 12/1999 | Walker et al. |
| 6,027,822 A | 2/2000 | Blanyer et al. |
| 6,051,335 A | 4/2000 | Dinh-Sybeldon et al. |
| 6,071,641 A | 6/2000 | Zguris |
| 6,077,623 A | 6/2000 | Grosvenor et al. |
| 6,117,196 A | 9/2000 | Snyder et al. |
| 6,124,059 A | 9/2000 | Böhnstedt et al. |
| 6,132,901 A | 10/2000 | Clough |
| 6,143,441 A | 11/2000 | Zguris et al. |
| 6,168,886 B1 | 1/2001 | Clough |
| 6,180,286 B1 | 1/2001 | Rao et al. |
| 6,187,478 B1 | 2/2001 | Clough et al. |
| 6,190,799 B1 | 2/2001 | Clough |
| 6,268,081 B1 | 7/2001 | Clough |
| 6,306,539 B1 | 10/2001 | Zguris |

FOREIGN PATENT DOCUMENTS

| | | |
|---|---|---|
| EP | 0 352 115 | 1/1990 |
| EP | 0 377 828 | 7/1990 |
| EP | 0 553 430 | 8/1993 |
| EP | 0 608 590 | 8/1994 |
| EP | 0 680 105 | 11/1995 |
| EP | 0 736 922 | 10/1996 |
| GB | 1 572 233 | 7/1980 |
| JP | 55-66865 | 5/1980 |
| JP | 55-86066 | 6/1980 |
| JP | 55-108175 | 8/1980 |
| JP | 55-139765 | 10/1980 |
| JP | 57-147871 | 9/1982 |
| JP | 57-162259 | 10/1982 |
| JP | 58035867 | 2/1983 |
| JP | 60-28171 | 2/1985 |
| JP | 62-160659 | 7/1987 |
| JP | 1-134865 | 5/1989 |
| JP | 9-92252 | 4/1997 |
| JP | 9-92268 | 4/1997 |
| JP | 9-115581 | 5/1997 |
| JP | 9-134716 | 5/1997 |
| JP | 9-289035 | 11/1997 |
| JP | 10-40922 | 2/1998 |
| JP | 10-50337 | 2/1998 |
| JP | 10-92421 | 4/1998 |
| JP | 10-134794 | 5/1998 |
| JP | 10-134803 | 5/1998 |
| JP | 10-199562 | 7/1998 |
| JP | 10-321234 | 12/1998 |
| WO | WO 93/23885 | 11/1993 |
| WO | WO 97/11501 | 3/1997 |
| WO | WO 98/00875 | 1/1998 |
| WO | WO 99/12219 | 3/1999 |
| WO | WO 00/65629 | 11/2000 |
| WO | WO 01/26170 | 4/2001 |

* cited by examiner

BATTERY PASTE

REFERENCE TO RELATED APPLICATIONS

This is a continuation in part of application Ser. No. 09/413,344, filed Oct. 6, 1999, now abandoned.

FIELD OF THE INVENTION

This invention relates to battery pastes, and, in particular, to battery pastes which contain additives, and to negative and positive active material which can be produced by applying the battery pastes to grids, curing and forming. The invention also relates to a method for introducing the additives into the paste, to plates made by applying pastes made by the method to grids, curing and forming, to formed plates so produced, and to electrochemical cells, including batteries, containing such formed plates. The additives enable the modification of the paste so that positive and negative active material produced therefrom has improved resistance to vibration, and there is increased utilization of active material capacity and, as a consequence, increased initial specific capacity in batteries containing the positive and negative active material, by comparison with batteries made from previously known battery pastes, including ones containing chopped glass fiber strand having an average diameter of about 0.013 millimeter and ones containing glass fibers which are tin coated. In one embodiment, glass microfibers or glass particulates which have such a chemical composition that they release Ni, Pt, Ba, Co, Sb, Bi, Sn and other ions which it is desirable to introduce into positive active material and negative active material are introduced into the battery pastes.

BACKGROUND OF THE INVENTION

The Prior Art

Lead acid batteries are commonly used in many applications such as automobiles, golf carts, wheel chairs, UPS and in telecommunication, where two different kinds of demands are placed on these batteries. In one kind of application the battery is required to stand-by until a need for power arises, while, in the other, the battery is called upon to deliver power periodically, on a more or less regular basis. The former type of application is called "float service" or a stand-by application, while the latter is called cycle service. A golf cart battery, which may be deeply discharged every day, is an example of cycle service. Another recognized battery application is called "SLI", and is found in automotive service where there are quick demands for start, lighting and ignition of the vehicle.

The lead acid battery has both positive and negative plates, separator, and electrolyte, all packed in a case. The plates of a battery are typically planté, pasted or tubular plates. In Planté plates, lead oxide is generated by direct oxidation of the lead that forms a conducting substrate, or grid. The oxide layer is formed by a large number of charge-discharge cycles. In pasted plates, a paste composed of active materials such as lead oxide (PbO) and metallic lead, called grey oxide or lead dust, is applied to the conducting substrate or grid and "formed" by charging either in a "forming bath" of electrolyte or after the pasted substrate has been assembled with the other components of a battery. In tubular positive plates, either individual tubes or gauntlets of tubes are filled with active material pastes and then formed. The active material is retained by the individual tubes or gauntlets and the current is collected by a central spine which is located interior of the tubes.

In the lead acid battery, lead is used to manufacture both a grid and the active battery paste or material that is applied to the grid in the production of a pasted plate. The lead that is used to make the active material is generally oxidized by one of two mechanical processes, the Barton pot or the ball mill. There are other processes, such as chemical oxidizing of the lead, which can be carried out in rotary tube furnaces, molten litharge furnaces, lead fume chambers and batch furnaces.

In the Barton pot process, a fine stream of molten lead is circulated around the inside of a heated vessel, where oxygen from the air reacts with fine lead droplets or particles to produce an oxide coating around each droplet.

Ball milling is a general term for a large variety of processes that, generically, involve milling large lead pieces in a rotary mechanical mill. With attrition of lead in the mill, lead pieces and then fine metallic flakes are formed; the fine flakes are oxidized to a lead oxide by an air flow in the mill, which also removes the lead oxide particles to a storage silo, where they are collected. The active material which is applied to the grids is a paste which can be made by adding sulfuric acid, water, and various additives, usually called expanders, to the mixture of lead oxides from the storage silo. The other additives may differ depending on whether the paste is for the negative or positive plate. One addition that is made to both positive and negative pastes consists of (floc) fibers, generally of the textile class of organic fibers that are cut to short lengths, and are used in very small amounts, typically of the order of 0.1 percent, based upon the initial oxide weight. Such additives as carbon black, barium sulfate and lignin sulfonates are used in the paste for the negative plates. Paste mixing in general is controlled to achieve a desired paste density, determined using a cup with a hemispherical cavity and by the measurement of paste consistency with a penetrometer. Paste density will be influenced by the total amount of water and acid used in the paste, by the specific identity of the oxide or oxides used, and by the type of mixer used.

Various types of equipment are used in production to paste plates. The control of the pasting of the plate is critical to achieving uniform and consistent performance of the battery. The suitability of the paste for application by this equipment is dependent on the reology of the paste, which is dependent on many factors but is critical to having good processing properties in the plate pasting process. With conventional paste, adding too much acid or water will produce a paste that can not be pasted in conventional commercial plate pasting equipment.

After the plates are pasted, they are cured. For example, "hydroset" cure, which is typically used for SLI plates, involves subjecting the pasted plates to a temperature which, preferably, is between 25 and 40° C. for 24 to 72 hours. The curing is important, especially for the positive plate. During the curing step, the lead content of the active material is reduced by gradual oxidation from about 10 to less than 3 weight percent. Furthermore, the water (about 50 volume percentage) is evaporated. This evaporation must be done quite carefully, to ensure that the volume occupied by the water actually gives rise to porosity and is not lost by shrinkage, which again might lead to the formation of cracks"[1]. The total fluidity of the paste, and, therefore, the proportion of water and acid therein, is critical because a paste with too much fluidity can not be pasted commercially to produce a grid which has an acceptable structural integrity. Fluidity is a key process variable that must be carefully controlled if acceptable plates are to be made, and the fluidity required varies, depending on the type of pasting machine used. For example, a belt paster can be used with a paste having a given fluidity, but an orifice paster requires a paste with a fluidity slightly higher than the given fluidity, and apparatus of the kind used to produce small round cells, where the paste is sprayed (see, for example, U.S. Pat. No. 5,045,086, which discloses a spraying method for applying battery pastes to grids), requires an even more fluid paste. The particle size and surface area per unit of weight of the oxide or oxides pasted influence the fluidity of the paste produced, and must be taken into account in preparing the oxide or oxides for pasting.

[1]See, Handbook of Battery Materials/ed. Jurgen O. Besenhard, Wiley-VCH, 1999; ISBN: 3-527-29469, page 167

The plates, after they have been pasted and the paste has been cured, are then formed by either a tank formation process or a container formation process. In tank formation the pasted plates are placed in tanks of fairly dilute sulfuric acid and a direct current is applied to the plates to convert the positive paste to PbO and the negative paste to spongy lead. In the container formation process, the battery is first assembled and filled with electrolyte, and a direct current is then applied to the plates to convert the positive paste to PbO and the negative paste to spongy lead.

The negative for tubular plates is manufactured by the pasted plate process while the positive is produced from a grid that consists of vertical lead rods in the centers of tubes of woven, braided or nonwoven fabrics. The tubes are filled with a lead oxide powder, usually with the aid of vibrators, or with a slurry or paste of lead oxide, and the splines are attached to a header bar and a connection lug. Filling the tubes with either the powder or the slurry is a difficult operation.

When a lead-acid battery is discharged, lead dioxide (electrical resistance $10^{-5}$ to $10^{-6}$ Ohm/m$^2$) is converted to an insulator, $PbSO_4$. The lead sulfate can form an impervious layer encapsulating the lead dioxide particles, and limiting the utilization of lead dioxide particles to less than 50 percent, typically around 30 percent. The power output is significantly influenced by the state-of-charge or of -discharge of the battery, since the lead sulfate provides a circuit resistance whenever the battery is under load. During operation of a battery the lead sulfate can grow into large hard, angular crystals, disrupting a layer of paste on the grid and causing flaking and shredding of the active material from the plate. Power consumption during charge is also increased because of the presence of the lead sulfate insulator. The lead sulfate crystals in the negative electrode can grow to a large hard condition and, due to the crystal insulating characteristic, are difficult to reduce back to lead. Even when there are very thin layers of active material on the grids, the coating of insulting lead sulfate interferes with power output.

The power and energy performance of the lead-acid battery is inherently less than optimum because most of the active material does not react in the electrochemical cycle of the battery. The active material that does not react during discharge may be viewed as dead weight, which undesirably increases the weight of the battery and concomitantly decreases the energy-to-weight ratio and power-to-weight ration of the battery. The active material that does not react provides structure and conductivity for the active material that does react.

The positive plate of the lead-acid battery is the plate that normally fails in a deep cycle application. The positive material softens as a battery is cycled; this softening can eventually cause the battery to fail. Failure can occur when softening causes lost contact between the positive active material and the grid. Such failure is called premature capacity loss II (PCL II). In Valve regulated batteries with absorbed glass separator if sufficient compression (force exerted to the plate-paste interface) is used separation between the paste and the grid can be eliminated or at least minimized. In flooded lead-acid batteries, the separator does not exert enough force to prevent grid/paste separation, which occurs and causes softening of the active material and loss of capacity and eventual failure of the battery. The softened active material, in a flooded battery, can fall to the bottom of the battery (a phenomenon called "paste shedding"), and then can cause a bridge between a positive and a negative plate and battery failure because of a short circuit. Pocketed (enveloped) separators have been used in flooded systems to minimize short circuits caused by paste shedding. In heavy duty applications, SLI flooded lead acid batteries are constructed with ribbed separators that have a veil, which is a reinforcing mat, laminated to the ribs of the flooded separator. These separators are used to help retain the paste on the plates, but cost two to three times as much as non-reinforced separators. In industrial traction batteries, very complex separator systems are used to help keep the paste from falling out or shedding from the plate.

The softening of the active material also increases the exposure of the grid to sulfuric acid, accelerating grid corrosion and some times producing an insulating layer on the grid which prevents the active material from being in good electrical contact with the grid, and causes battery failure because of PCL II.

A major problem associated with extending the life of lead acid batteries is maintaining the integrity of the positive plate. Therefore, additives have been invented to improve the capacity of the battery.

Negative active battery pastes which contain chopped glass fiber strand having an average diameter of about 0.013 millimeter are known, being disclosed, for example, in U.S. Pat. No. 4,323,470, granted Apr. 6, 1982 to Mahato et al.

The following U.S. patents also deal with battery pastes, including, at least in some cases, such pastes containing glass fibers: U.S. Pat. No. 4,323,470, issued Apr. 6, 1982; U.S. Pat. No. 4,336,314, issued Jun. 6, 1982; U.S. Pat. No. 4,391,036, issued Jul. 5, 1988; U.S. Pat. No. 4,414,295, issued Nov. 8, 1983; U.S. Pat. No. 4,414,297, issued Nov. 8, 1983; U.S. Pat. No. 4,507,372, issued Mar. 26, 1985; U.S. Pat. No. 4,510,219, issued Apr. 9, 1985; U.S. Pat. No. 4,606,982, issued Aug. 19, 1986; U.S. Pat. No. 4,631,241, issued Dec. 23, 1986; U.S. Pat. No. 4,725,516, issued Feb. 16, 1988; U.S. Pat. No. 4,735,870, issued Apr. 5, 1988; U.S. Pat. No. 4,873,161, issued Oct. 10, 1989; U.S. Pat. No. 5,009,971, issued Apr. 23, 1991; U.S. Pat. No. 5,035,966, issued Jul. 30, 1991; U.S. Pat. No. 5,075,184, issued Dec. 24, 1991; U.S. Pat. No. 5,114,806, issued May 19, 1992; U.S. Pat. No. 5,206,100 issued Apr. 27, 1993; U.S. Pat. No. 5,219,676, issued Jun. 15, 1993; U.S. Pat. No. 5,223,352, issued Jun. 29, 1993; U.S. Pat. No. 5,225,298, issued Jul. 16, 1993; U.S. Pat. No. 5,302,476, issued Apr. 12, 1994; U.S. Pat. No. 5,336,275, issued Aug. 9, 1994; U.S. Pat. No. 5,348,817, issued Sep. 20, 1994; U.S. Pat. No. 5,376,479, issued Dec. 27, 1994; U.S. Pat. No. 5,468,572, issued Nov. 21, 1995; and U.S. Pat. No. 5,998,062, issued Dec. 7, 1999.

Two U.S. Patent to Rowlette, U.S. Pat. No. 4,507,372, issued May 26, 1985, and U.S. Pat. No. 4,735,870, issued Apr. 5, 1988, disclose adding $SnO_2$ coated glass fibers to a positive battery paste to maintain conductivity during charge and discharge. It is reported that the addition causes an increase in bulk and prevents a loss of capacity which usually occurs when lead sulfate is formed in service because the oxide coated glass replaces some of the lead oxide in the paste. Brief mention is made in the patents of glass wool. Experiments that have been performed, as subsequently described herein, demonstrate that a tin coated glass fiber does not provide the reinforcement benefit discovered when uncoated microglass fibers are added to a battery paste. The Rowlette patents also disclose that the power characteristics of a lead-acid battery are improved by incorporating a dispersion of from 1 to 10% by weight of a thermodynamically stable conductivity additive, such as glass fibers of filamentary glass wool coated with conductive tin oxide, and used as an additive in the positive active material carried on the grid of the positive plate. The later Rowlette patent also discloses that it is necessary to avoid positive plate reversal to prevent reduction of the tin oxide, and that this can be accomplished by employing an oversize positive plate and pre-charging it; by pre-discharging the negative plate; and/or by placing a circuit breaker in combination with the plates and terminals to remove the load when the voltage of the positive plate falls below a preselected level.

A paper presented by Williams and Orsino at the Forty-Eighth Annual meeting of the American Ceramic Society, May 1, 1946[2], discussed the addition of nickel to storage batteries, and the fact that a monomolecular layer of metallic nickel may be all that is required to depolarize the plate catalytically. The paper discusses the fact that cycling has the effect of burying the layer of nickel within the structure of the sponge lead (negative) and the need for perpetually renewing the catalytic layer. Williams disclosed that the way to solve this problem was to add a glass which contained from 0.00006 to 0.047% nickel to the battery paste used to produce the negative plates. The slow solubility of the glass made it one material that could satisfy the need for a slow replenishment of nickel. A paper by G.W. Vinal et al., 1940, "Note on Effects of Cobalt and Nickel in Storage Batteries" showed that Nickel added to the electrolyte of a battery as nickel sulfate depolarized the negative plates.

[2]See "Lead-Nickel Glass of Controlled Chemical Durability for Storage Battery Use", The American Ceramic Society Journal, Volume 29, No. 11, pages 313–316.

U.S. Pat. No. 5,667,917 issued Sep. 16, 1997 discloses fillers with conductive coatings, (glass microspheres) or a combination of fillers with conductive coatings and nonconductive fillers as an integral part of the active material of the electrode. The fillers reduce the amount of active material of the electrode. The patent also discusses that the inclusion of fillers in the active material of the plate allows the electrolyte diffusion in the plate to be controlled so that the utilization of the active material is also improved.

The following published Japanese patent applications (Kokai) also deal with battery pastes, including, at least in some cases, such pastes containing glass fibers: 10321234, publication date Dec. 4, 1998; 10199562, publication date Jul. 31, 1998; 10134803, publication date May 22, 1998; 10134794, publication date May 22, 1998; 10092421, publication date Apr. 10, 1998; 10050337, publication date Feb. 20, 1998; 09289035, publication date Nov. 4, 1997; 09134716, publication date May 20, 1997; 09115581, publication date May 2, 1997; 09092268, publication date Apr. 4, 1997; and 09092252, publication date Apr. 4, 1997.

The following published European patent applications also deal with battery pastes, including, at least in some cases, such pastes containing glass fibers: 0736922, publication date Oct. 9, 1996; 0680105, publication date Nov. 2, 1995; 0608590, publication date Aug. 3, 1994; 0553430, publication date Aug. 4, 1993; 0377828, publication date Jul. 18, 1990; and 0127301, publication date Dec. 5, 1984.

Japanese Patent application No. 55-108175 discusses mixing hollow microbodies as a component of the active material of the plate of a battery. The hollow microbodies are resistant to the acid in the electrolyte and form multiporous structures. The microporous bodies are hollow and include shells joined to cavities filled with electrolyte. The cavities are joined to regions of the plate that participate in the charging reaction.

Japanese Patent application No.62-160659 discusses the inclusion of hollow carbon balloons in the active material of the plate of a battery, while application No. 55-66865 discusses mixing hollow microspheres such as armsosphere, philite, shirar ballons, silica balloons, and carbon balloons into the active material of the plate of a battery to improve the discharge characteristics of the plate.

U.S. Pat. No. 5,660,949 discloses an electrolyte additive containing antimony for use with lead acid batteries. The electrolyte additive is produced by mixing synthetic oil, naphthenic oil, zinc free rust, oxidative inhibitors and an ethylene propylene copolymer, and is placed above the plate cells in lead acid batteries containing antimony; it is said to inhibit gassing and misting with an ancillary benefit of increasing performance and durability of the battery Attempts were made to make a further improvement in material utilization and specific capacity of batteries by substituting glass microfibers for the chopped strand in the paste disclosed by the Mahato et al. patent, and thereby to provide separators that would increase the surface area of a battery paste. It was found, however, that glass microfibers having an average fiber diameter of about 3 microns, when added in amounts as low as about 0.01 percent, based upon the weight of the lead oxide in the paste, made the paste unworkable and, therefore, useless in the sense that it could not be used to paste battery plates.

THE INSTANT INVENTION

The instant invention is based upon the discovery that battery paste containing uncoated glass fibers having an average diameter of about 3 microns, and in amounts ranging from 0.02 percent up to about 15 percent, based upon the weight of the lead oxide initially in the paste, can be produced by a mixing or blending process, for example in a Hobart mixer operating at about 85 revolutions per minute, of water and about half of the microglass fibers that are to be incorporated in the paste, adding the PbO and continuing mixing until the water has formed a paste with the PbO, adding the rest of the fibers and the rest of the water, continuing mixing until a consistent paste is formed, adding a dilute sulfuric acid solution, mixing for an additional two to three minutes, adding sulfuric acid to bring the paste to a conventional composition, and mixing the final composition, for example, for about 10 minutes until the material cools to a temperature of about 100° F.

It is anticipated that small diameter glass fibers, which are sometimes called "microfibers" or "nanofibers", will be effective at reinforcing the crystal structure in both negative active material and positive active material, that the zero contact angle of wetting of the glass will enable more acid to penetrate deeper into both negative and positive active material, thus providing greater utilization of the active mass, and that the reinforcement provided by the fibers will restrain movement of both the negative active material and the positive active material. It is also anticipated that the small diameter glass fibers will reduce dusting during manufacturing of the paste, and will, therefore, provide a health benefit.

Further, it is anticipated that the small diameter glass fibers will improve the resistance of the active material to compression, will increase the resistance of the active material to crushing, will reinforce, and increase the initial porosity of, the active material, enabling it, as a consequence, to resist growth during discharge as the lead or lead oxide is converted to larger crystals of lead sulfate, and will improve utilization of the active material and reduce the weight thereof required. The use of the glass microfiber will increase the porosity of the paste and cause a corresponding decrease of its density, so that a given poundage of the paste will produce a substantially greater number of plates.

The instant invention is also based on the discovery that all the additives, inclusive of the microglass, to the negative paste or positive paste can be preformed into a premanufactured microglass sheet, board or roll to provide an operator the convenience, accuracy and health and safety of a premeasured, one component additive. In addition, the fibers, sheet, board or roll can be composed of or can contain microglass fibers or particles of special glass compositions which release such ions as Ni, Pt, Ba, Co, Sb, Bi, and Sn but still provide the strength enhancement and other benefits of the microglass fibers in the paste, or the sheet, board or roll can contain particles having a surface area of at least 0.3 $m^2/g$ of glass which release such ions as Ni, Pt, Ba, Co, Sb, Bi, and Sn.

The instant invention also contemplates that a positive or negative paste containing glass microfibers can be subjected to compression to increase its density. For example, the paste can be applied to plates, cured to a desired moisture content, and compressed between two platens while lateral movement of the paste is prevented by a resilient ring which is also between the platens, and which surrounds the paste. Such a compression step would tend to counteract the reduction in density which is occasioned by the presence of glass microfibers in a paste. The microfibers, which have a density of about 2.5 grams per cubic centimeter, replace an equal volume of lead/lead oxide, which has a much higher density, ranging 8.0 to 11.337 grams per cubic centimeter and, therefore, weighs considerably more than the fibers which replace it.

Finally, the present invention contemplates a pasted plate wherein there is a sheet of glass fiber, cellulosic or synthetic, non-woven pasting paper between the positive active material and the grid, between the negative active material and the grid, or between both the positive active material and the grid and the negative active material and the grid.

It has been found that from 0.02 to 15 percent by weight of uncoated microglass fibers in a paste used to produce plates for a lead acid battery can offer the following improvements:

The fibers reinforce and enhance the strength of the paste, increasing manufacturing efficiency, decreasing shedding of active material, shingling on pasting, and pellet popping, improving vibration resistance and manufacturing efficiency, reducing scrap as a consequence of improving mechanical strength, and providing plates which dry without cracking while they are being cured. The presence of the fibers in the paste also provides for improved health and safety because of reduced dusting from the paste, and makes it possible to produce batteries in which the compression on separator between adjacent plates and consequent strain on the battery case are reduced. The manufacturing process is also simplified because less force is required to compress a stack of plates and separator before the stack is inserted into a case.

A battery paste according to the invention containing glass microfibers can also be used at a greater fluidity, making it possible to produce pasted plates of increased porosity, energy density, and active material utilization. The weight of the active material in a battery plate can also be reduced.

Glass microfibers can be used in the pastes for either or both of the positive and negative plates of a battery, and in differing amounts. For example 6 percent of glass microfibers may be added to the positive active material, while only 2 percent or none is added to the negative. This makes it possible to produce batteries in which the negative and positive plates have different efficiency or capacity which can be highly advantageous for some battery applications.

The glass microfibers used in positive and negative pastes can also have different diameters, or different chemical composition, to provide optimum benefits when the positive and negative active pastes have crystals of different particle size.

The increased porosity of the paste and the fact that the microfiber surface is hydrophillic provides for improved mass transport especially for high rate application, and the increased porosity provides greater surface area for reactions which are surface area related, e.g., recombination and gas generation on charging. The fiber structure can provide for easier acid diffusion through the lead sulfate layer, improving the conductivity of the plate.

The improvement that microglass fibers provide in positive active and negative active materials is responsible for improved energy density, improved active material utilization, a reduction in the weight of active material required, and improved manufacturing yields.

The fibers and particulates in battery pastes according to the invention can also act as a delivery system for ions that are beneficial in the pastes, and the fibers constitute a reinforcement, differing from particle additives in this respect.

The fibers in battery pastes according to the invention can be derived from the separators of used batteries which have been scrapped.

The glass fibers in battery pastes according to the invention are preferably composed of chemically resistant glass, for example, of the type disclosed in U.S. Pat. No. 4,558,015, Dec. 10, 1985, entitled "Chemically resistant refractory fiber" or of the type known in the art as "C Glass". The chemically resistant fibers are disclosed as follows in the indicated patent:

"The objects of the present invention are satisfied by a compositional formulation suitable for producing refractory fibers which is virtually free of alkali metal oxide fluxes, comprising from 56 to 76% silica, from 12 to 33% alumina and from 3 to 22% zirconia. Fibers having this basic chemical composition have been found to be essentially chemically inert in both acidic and alkaline environments. Examples of such environment would be acidic solutions in batteries or calcium silicate products, even when those products are heat treated at temperatures of 300° to 1100° F. (150° to 593° C.). These refractory fibers are formulated by impinging a molten stream upon the surfaces of two rapidly rotating spinners. This process for manufacturing spun fibers is actually more efficient when the melt stream is in the range of 3000° F. (1705° C.), making the use of the fluxing agents noted above, undesirable."

C-Glass fibers are identified in U.S. Pat. No. 4,510,252, Potter, Apr. 9, 1985, which states:

"C-Type glasses have long been known in the glass fiber industry as being suitable as reinforcing fibers when chemical durability is needed. These type fibers are essentially alkali, alkaline earth, alumino borosilicate compositions with an early C-Type composition being exemplified by U.S. Pat. No. 2,308,857. K. L. Lowenstein, in the book entitled The Manufacturing Technology of Continuous Glass Fibers (Elsevier Scientific Publishing Co., 1973), at page 29, discloses an exemplary C-Type glass composition of 65% $SiO_2$, 4% $Al_2O_3$, 5% $B_2O_3$, 3% MgO, 14% CaO, 8.5% $Na_2O$ and 0.5% $Fe_2O_3$. A more specific C-Type composition, which has been available for many years, is a composition of about 65.5% $SiO_2$, about 3.8% $Al_2O_3$, about 0.1% $Fe_2O_3$, about 13.7% CaO, about 2.4% MgO, about 8.9% of ($Na_2O+K_2O$), about 0.2% $TiO_2$, and about 5.5% $B_2O_3$."

OBJECTS OF THE INVENTION

It is, therefore, an object of the instant invention to provide a method for producing a battery paste containing from about 0.02 to about 15 percent by weight of glass fibers having an average fiber diameter from about 0.25 micron to about 10 microns.

It is another object to provide a battery paste containing from about 0.02 to about 15 percent by weight of a glass filler having a surface area of at least 0.3 square meters per gram, and including glass fibers having an average fiber diameter from about 0.25 micron to about 40 microns, and such a glass chemistry that, during service, there is a slow diffusion of such ions as Ni, Pt, Ba, Co, Sb, Bi, and Sn from the glass fibers into the positive active material or negative active material of the battery.

It is still another object to provide a battery paste that forms a positive active material or a negative active material which has increased resistance to cracking by comparison with positive active material or negative active material formed by conventional battery pastes.

It is yet another object to provide a microglass sheet or roll which constitutes a delivery system for the additives that are required in the paste because those additives are incorporated into the sheet or roll.

It is a still further object to provide a method for producing a battery paste which includes the step of reclaiming microglass fibers from the separator of recycled lead acid batteries or other electrochemical cells and mixing the reclaimed fibers with at least one lead oxide, at least one lead oxide sulfate, water and sulfuric acid to produce the paste.

Other objects and advantages will be apparent from the description which follows, which is intended only to illustrate and disclose, but not to limit, the invention, reference being made to the attached drawings in which:

DESCRIPTION OF THE PREFERRED EMBODIMENTS

The following examples describe the best mode presently contemplated by the inventors for producing battery pastes, pasted plates and batteries according to the invention. As used in the Examples and elsewhere herein, the terms "percent" and "parts" refer to percent and parts by weight; "g" means gram or grams; "kg" means kilogram or kilograms; and "ml" means milliliter or milliliters; "cc" means cubic centimeter or cubic centimeters; and all temperatures are in degrees F., unless otherwise indicated.

Example 1

A battery paste according to the instant invention was produced by a procedure which involved the following steps: charging 525 ml water and 100 g glass fibers having an average diameter of substantially 3 microns to a Hobart mixer; mixing the fibers and water for about 5 minutes by operating the mixer at 85 revolutions per minute; adding 3405 g PbO to the mixer and continuing mixing until all of the free water had been mixed with the PbO; charging 175 ml water and 38.2 g glass fibers having an average diameter of substantially 3 microns to the mixer and continuing mixing until there was a uniform paste in the mixer; charging 1.55 ml sulfuric acid containing 49 per cent by weight of $H_2SO_4$ diluted to 155 ml with water, to the mixer and continuing mixing for 3 minutes; and charging 130 ml sulfuric acid containing 49 per cent by weight of $H_2SO_4$ to the mixer and continuing mixing for about 10 minutes until the paste in the mixer cooled to 100° F. The paste had a density of 58.00 g/inch$^3$.

The glass fibers used as described above in Example 1 and subsequently in Examples 2 and 3 have a fiber diameter of about 3 microns. Other commercially available fibers having a diameter from 0.25 micron to 10 microns can also be used. The performance of pastes according to the invention depends, among other things, on the surface area of the glass fibers therein. Accordingly, an increased proportion of coarser fibers can be used to achieve substantially the same result as with a given proportion of finer fibers, and a decreased proportion of finer fibers can be used to achieve substantially the same result as with a given proportion of coarser fibers.

Examples 2 and 3

The procedure described in Example 1 was repeated except that the total charge of glass fibers was 204.3 g, and the initial charge was 150 g of the fibers; the total charge of water was 750 ml in Example 2 and 600 ml in Example 3, and the initial charge was 575 ml in Example 2 and 425 ml in Example 3. The battery paste of Example 2 had a density of 50.97 g per inch$^3$; that of Example 3 had a density of 54.50 g/inch$^3$.

A blend of two or more glass fibers having different diameters and, therefore, different surface areas, usually expressed in $m^2/g$, can be used to produce a paste according to the instant invention. A smaller diameter fiber has a greater available hydrophilic surface area than a larger diameter fiber and, therefore, will be able to absorb more water during the paste mixing procedure. The relationship between glass fiber diameter and surface area expressed as $m^2/g$ is influenced by the density of the fiber, which is typically in the 2.4 to 2.6 g/cc range. The length of a glass fiber can influence surface area. This influence increases as the length decreases because a greater number of short fiber ends are exposed per gram of fiber. The end effects can become more significant if a fiber is crushed or shortened in fiber length to assist in the mixing process involved in production of the paste. The crushing of fibers to shorten fiber length, which, typically, is about 150 times the diameter of the fiber, makes dispersing the fibers in the paste process easier, but a shorter fiber is a less effective reinforcement for the active material once the paste is pasted onto the grid. Glass fibers which are useful in practicing the instant invention are typically made as wool; the diameters stated represent are average values which are calculated from BET surface area measurements or from some form of air resistance measurement protocol. Although glass fiber additives as typically made have a range of fiber diameters, an additive where all the fibers have the same diameter would be capable of providing equal benefits in a battery paste. It is difficult to provide any measurement of glass fiber length because there is no acceptable test protocol unless the fiber is crushed or ball milled to a suitable length. While the typical length could be obtained by SEM examination or using other suitable equipment such procedures are not ordinarily employed. Nevertheless, when ball milled fibers are used in practicing the instant invention, it is usually preferred that the average length to diameter ratio of the fibers be at least 5:1 as measured by SEM examination. It is known that glass fiber diameter can be calculated from a determination of the BET surface area of the fibers under study, using cryogenic liquid nitrogen or liquefied krypton or argon, and that these calculations differ from the values determined by SEM examination; fiber diameters are reported herein on the basis of calculations based upon determinations of BET surface area.

Examples 4 and 5

The procedure described in Example 1 was repeated, using commercial equipment, to produce additional battery pastes. The initial and total charges of glass fibers, the initial and total charges of water, the PbO charges and the sulfuric acid charges are given in the following table:

|  | Example 4, positive paste containing 6 percent of glass fibers | Example 5, negative paste containing 2 percent of glass fibers |
| --- | --- | --- |
| Glass fibers, initial charge | 25 pounds | 25 pounds |
| Water, initial charge | 55 kg | 35 kg |
| Glass fibers, total charge | 75 pounds | 25 pounds |
| Water, total charge | 165 kg | 85 kg |
| Sulfuric acid | 135 pounds | 125 pounds |
| PbO (Barton oxide, 20 weight percent Pb Met) | 600 kg | 600 kg |
| Expander | *** | 12.5 pounds |
| Weight ratio, water to PbO | 0.275 | 0.142 |

The battery paste of Example 5 can also be produced by uniformly dispersing the expander in a mat of the glass microfibers (average diameter 3 microns) so that a given area of the mat contains 25 pounds of the microfibers and 12.5 pounds of the expander, and charging that area of the mat to the mixer, followed by 35 kg of water and, after initial mixing, an additional 50 kg of water, 125 pounds of sulfuric acid, and 600 kg of the Barton oxide. Similarly, other additives can be dispersed in the mat in such proportions that a given area of the mat contains the desired charge of glass fibers and of the desired additives.

Accordingly, in one embodiment, the instant invention is an article of manufacture which is a sheet or a mat composed of a mass of intermeshed fibers which can constitute an additive for a battery paste and, dispersed uniformly in the mass of intermeshed fibers, a second additive for a battery paste, the intermeshed fibers and the second additive being present in such proportions that a given area of the sheet or mat constitutes the amount of the intermeshed fibers and the amount of the battery paste additive required in a given quantity of the battery paste. In a preferred embodiment the sheet or mat is composed of a mass of intermeshed glass microfibers or of glass nanofibers. Most desirably, there are a plurality of additives for a battery dispersed uniformly in the sheet or mat of intermeshed fibers, and the additives are present in such proportions that a given area of the sheet or mat constitutes the amount of the intermeshed fibers and the amount of each of the plurality of battery paste additives required in a given quantity of the battery paste.

Figures 1, 2:
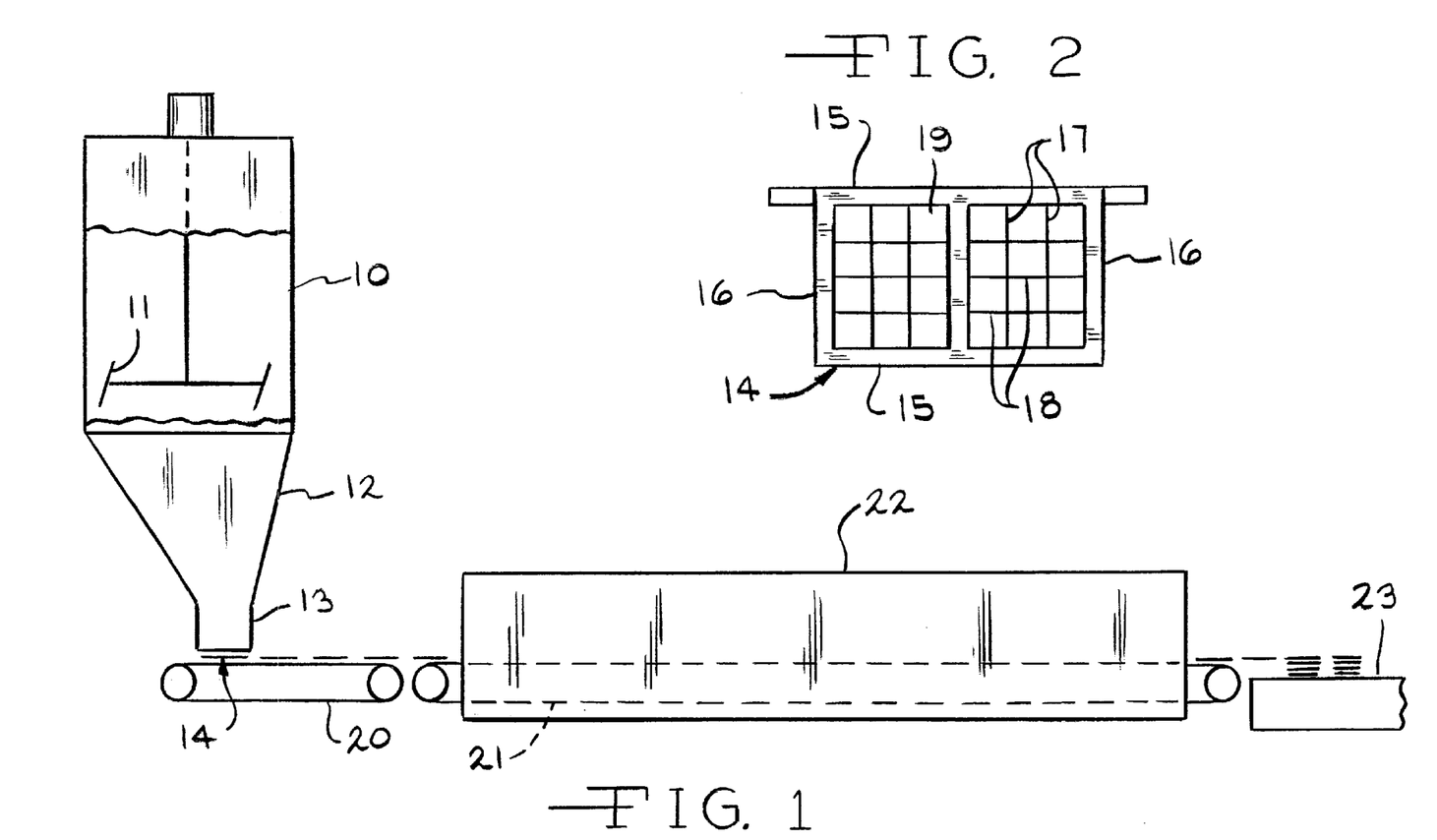
FIG. 1 is a schematic view in elevation showing apparatus which can be used to produce pasted battery grids according to the invention.
FIG. 2 is a plan view of an unpasted battery grid which can be pasted in the apparatus of FIG. 1 to produce pasted battery grids according to the invention.

The battery pastes of Examples 4 and 5 were used in commercial apparatus to paste grids composed of a grid alloy containing 98 percent by weight of lead, and minor amounts of alloying metals. The grids were 4¼ inches by 4½ inches by 0.1 inch. Referring to FIG. 1 of the drawings, successive batches of the paste were produced by the previously described method in a mixer 10, where they were agitated by mixing blades 11, and from which the paste was discharged into a paste hopper 12 which served a pasting hopper 13. Paste was discharged from the hopper 13 onto grids 14, which, as can be seen in FIG. 2, had a frame composed of side members 15, end members 16, cross wires 17 which extended between the side members 15 and wires 18 which extended between one of the end members 16 and a cross member 19.

Referring again to FIG. 1, the grids 14 with a body of paste deposited on each were transferred by a conveyor 20 to a conveyor 21 by which they were carried through an oven 22, which was maintained at a temperature of 200° C., and were discharged onto a table 23 which was moved downwardly by increments so that a stack about 10 inches high of the grids 14 and associated dried battery paste was collected thereon. The conveyor 21 moved the grids and associated battery paste through the oven 22 at such a rate that each was in the oven for substantially 1 minute.

The stacks of grids 14 and associated battery paste were transferred periodically from the table 23 for 3 to 5 days of curing, during which their lead content decreased from about 20 percent by weight to about 3 percent by weight as a consequence of reaction between the grids and the associated paste, and they became pasted plates. After curing, which is sometimes called "hydrosetting", the pasted plates were found to have a moisture content of substantially 13 percent by weight, while pasted plates produced from a classic battery paste mix composed of 600 kilograms of PbO, 130 pounds of sulfuric acid having a density of 1.385 grams per ml and 75 kilograms of water had a moisture content of 7 to 8 percent by weight.

Figure 4:
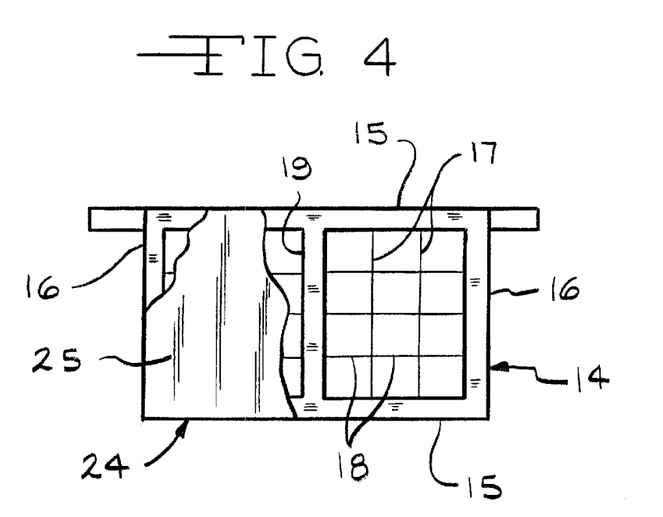
FIG. 4 is a plan view of a pasted plate produced in the apparatus of FIG. 1.

A double pasted plate is indicated generally at 24 in FIG. 4, with part of the paste 25 broken away to show the underlying grid 14.

The plates 24 were then subjected to a parting step by making a cut through the cross member 19 of the grid 14 so that each double plate was cut in half, yielding two pasted plates, each of which was then used for assembly, which involved a cast on operation and actual assembly of batteries, which were then formed and tested.

The pasted plates were subjected to vibration testing which involved weighing each plate to be tested, placing the weighed plate on a platen, subjecting the platen and the weighed plate to vibration in a vertical plane having an amplitude of 0.1 inch and a frequency of 60 hertz for five minutes, and weighing the vibrated plate. Percent of active material lost was then calculated by subtracting the plate weight after vibration from the plate weight before vibration, and dividing the difference by the plate weight before vibration times 0.01. Positive plates made as described from the paste of Example 4 lost 0.2 percent of their active material, while negative plates made as described from the paste of Example 5 lost 1.6 percent of their active material.

Conventional batteries, except that they contained positive plates produced as described above from the paste of Example 4 and conventional negative plates, were subjected to testing to determine the initial specific capacity in ampere hours per gram of positive active material at several different initial rates of discharge. Batteries of the same design which contained conventional positive plates and conventional negative plates were also subjected to the same tests. The positive plates in the batteries tested which were produced from the paste of Example 4 contained 288 grams of positive active material per cell, while the conventional positive plates of the batteries which were subjected to the same tests contained 370 grams of positive active material per cell. The numerical results of this testing, specific capacity in ampere hours per gram of positive active material, are presented in the following table:

|  | Batteries with positive plates made using Example 4 battery paste | Batteries with conventional positive plates |
| --- | --- | --- |
| 5 Minute rate | 8.1 Ah (0.028 Ah/g) | 6.6 Ah (0.018 Ah/g) |
| 2 hour rate | 21.8 Ah (0.076 Ah/g) | 22.1 Ah (0.060 Ah/g) |
| 20 hour rate | 30.3 Ah (0.105 Ah/g) | 30.5 Ah (0.082 Ah/g) |
| Total | 60.2 Ah (0.209 Ah/g) | 59.2 Ah (0.160 Ah/g) |

Figure 5:
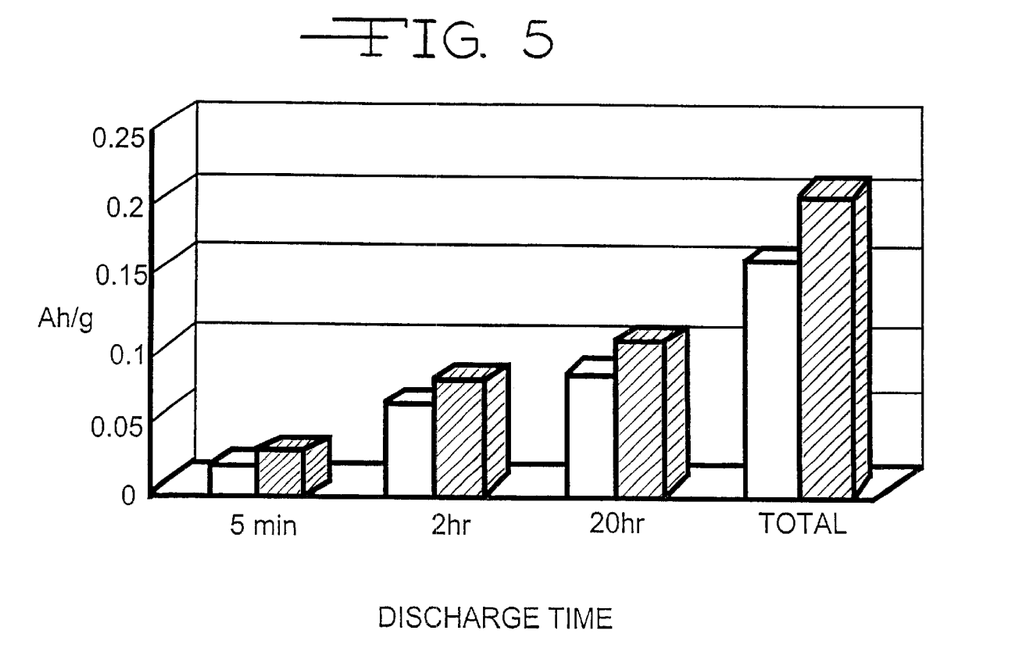
FIG. 5 is a bar chart representing the initial specific capacity in ampere hours per gram of positive active material of batteries with positive plates made using a battery paste according to the instant invention and the initial specific capacity in ampere hours per gram of positive active material of otherwise identical batteries with conventional positive plates.

The results of the foregoing testing are also presented graphically in FIG. 5 of the drawings.

The battery pastes produced as described in Examples 1–3 were produced from 3405 g PbO and 131.55 ml 49 percent $H_2SO_4$. (Since PbO has a formula weight of 223.21, this amounted to 3405÷223.21=15.2547 gram moles of PbO, and since sulfuric acid has a formula weight of 98.08 and 49 percent sulfuric acid has a density of 1.3854 g per ml at 20° C., this amounted to 131.55×1.3854×0.49÷98.08=0.9105 gram mole of $H_2SO_4$) When PbO is mixed with dilute sulfuric acid, reactions occur which produce basic lead sulfate ($PbSO_4.PbO$), so that, ultimately, those pastes were composed of 0.9105 gram mole of $PbSO_4.PbO$ and 13.43 gram moles of PbO. After the foregoing and other pastes are applied to grids to make pasted plates, more of the PbO therein is converted to the sulfate, but the total amount of PbO in the pastes and in the pasted plates is not changed by these reactions. Accordingly, it is customary to express the additive content of a battery paste and of a pasted plate made from the paste as a percent of the PbO initially charged to produce the paste. Numerically, the same result is achieved if the PbO and $PbSO_4.PbO$ contents of the paste or pasted plate are determined, and the additive content is expressed as a percent of the PbO content plus the $PbSO_4.PbO$ content, where the latter is calculated as PbO. For example, the foregoing paste contained 13.43 gram moles or 2998.54 g PbO and 0.9105 gram mole of $PbSO_4.PbO$, the latter, calculated as PbO amounting to 0.9105×2×223.21=406.46.

In general, pastes for negative plates may contain minor amounts of blanc fixe, lampblack and organic additives and 99 percent by weight of uncalcined oxides of lead (frequently called "leady oxides"), while pastes for positive plates also are composed mainly of uncalcined oxides of lead blended with perhaps as much as 20 percent by weight of $Pb_3O_4$, which is called "red lead". In both cases, sulfuric acid, usually dilute, is incorporated in the paste in the amount required to form the lead oxide sulfate or the lead oxide sulfates that is or are desired.

It is sometimes desired to produce battery plates which include pasting paper. The apparatus of FIG. 3 can be used to introduce a layer 24 of pasting paper below grids 14 as they progress from a conveyor 25 to a conveyor 26 after they have been deposited from a grid feeding station 27 onto the conveyor 25. The grids 14 with pasting paper between them and the conveyor 25 then progress between an anvil 27 and a knife 28 which are actuated periodically by cylinders 29 and 30 to cut the pasting paper between successive grids so that individual grids 14 with pasting paper therebelow are fed by the conveyor 20 under the pasting hopper 13 where they are pasted before passing through the oven 22 and being collected as previously described. The apparatus of FIG. 3 can also be used to introduce a layer 31 of pasting paper on top of the grids 14 as they progress from the conveyor 25 to the conveyor 26 so that individual grids 14 with pasting paper thereabove are fed by the conveyor 20 under the pasting hopper 13 where they are pasted before passing through the oven 22 and being collected.

Figure 3:
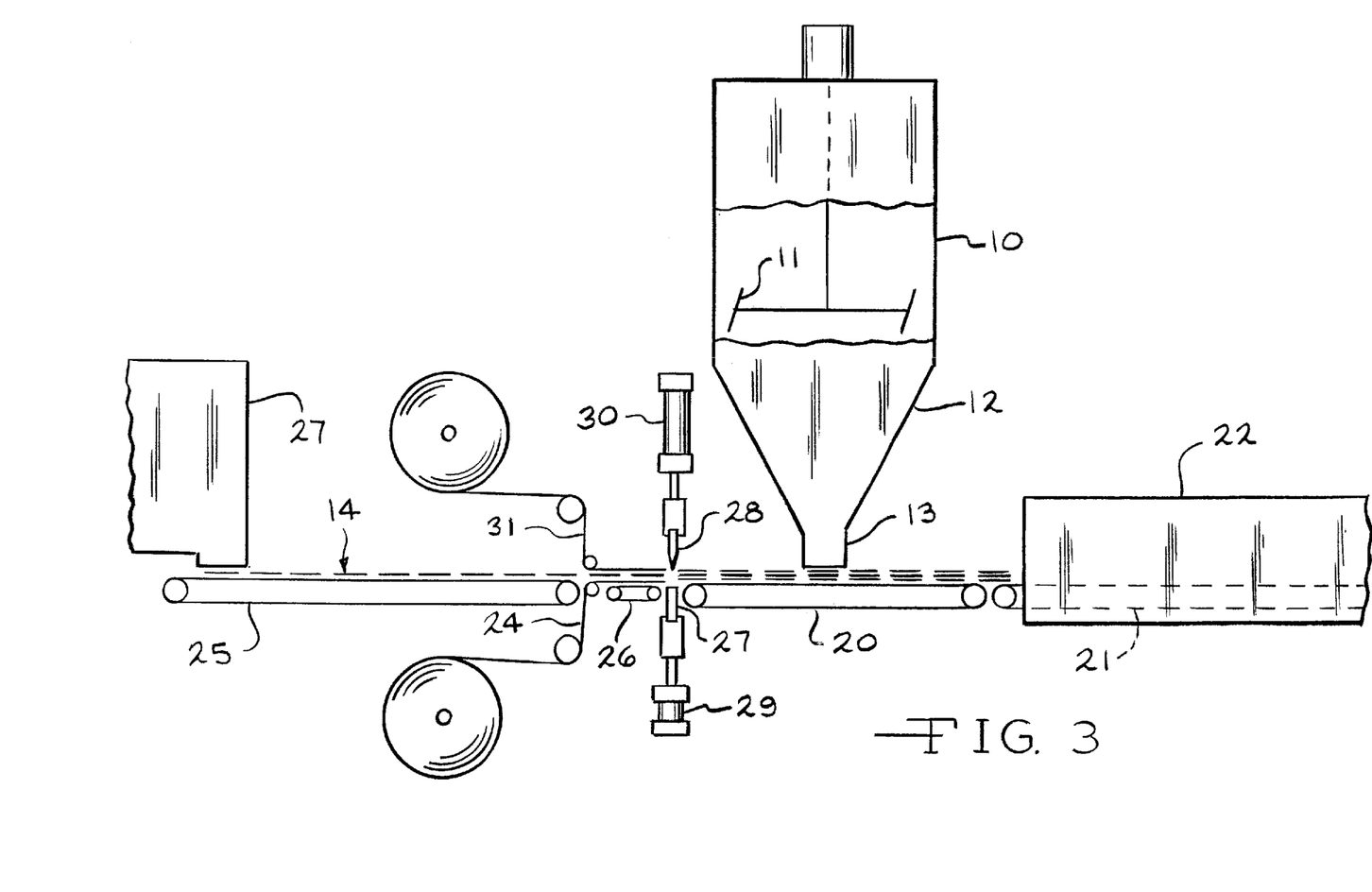
FIG. 3 is a schematic view in elevation showing apparatus similar to FIG. 1 showing apparatus which can be used to produce pasted battery grids according to the invention with a layer of pasting paper adjacent one or both surfaces of the pasted grids.

The apparatus of FIGS. 1 and 3 is shown as having an enclosed mixer 10 which serves an attached paste hopper 12 which is attached to a pasting hopper 13. It is usually desirable for the mixer 10 to serve a plurality of pasting stations and, therefore, to be separable from and movable relative to the paste hopper 12. A batch of battery paste is then produced in the mixer 10, and fed into the paste hopper 12, after which the mixer 10 is moved so that it can serve at least one other pasting hopper (not illustrated) before being returned to deliver another batch of battery paste to the paste hopper 12 of FIG. 1 or of FIG. 3. It is also desirable, usually, for the paste hopper 12 to be separable from the pasting hopper 13 so that the two can be separated for cleaning after they have been out of service for a time, or when it is desired to produce a different kind of paste. For example, the apparatus of FIG. 1 may be used alternately to produce positive active battery paste and negative active battery paste, in which it requires cleaning whenever the type of paste being produced changes.

It will be appreciated that the instant invention, in one aspect, is a battery paste consisting essentially of at least one lead oxide and at least one lead oxide sulfate, sufficient water to moisten the paste, and from 0.02 percent to 15 percent based on the weight of the lead oxide plus the weight of the lead oxide sulfate, calculated as the lead oxide, of glass fibers having an average diameter from about 0.25 micron to about 10 microns, and having their glass surfaces in direct contact with the lead oxide, the lead oxide sulfate, the sulfuric acid and the water.

In a further aspect, the instant invention is a battery paste consisting essentially of at least one lead oxide and at least one lead oxide sulfate, from 15 percent to 40 percent of water, based on the weight of the lead oxide plus the weight of the lead oxide sulfate, calculated as the lead oxide, from 0.02 percent to 15 percent based on the weight of the lead oxide plus the weight of the lead oxide sulfate, calculated as the lead oxide, of glass fibers having an average diameter from about 0.25 micron to about 10 microns, and having their glass surfaces in direct contact with the lead oxide, the lead oxide sulfate, the sulfuric acid and the water.

In another aspect, the invention is a method for producing a battery paste which consists essentially of at least one lead oxide and at least one lead oxide sulfate, from 0.02 percent to 15 percent, based on the weight of the lead oxide plus the weight of the lead oxide sulfate, calculated as the lead oxide, of glass fibers having an average diameter from about 0.25 micron to about 10 microns, sufficient sulfuric acid to form the desired lead oxide sulfate content and sufficient water to moisten the paste. The method comprises charging a part of the water and a part of the glass fibers desired in the paste to a mechanical mixer, subjecting the water and fibers to mixing, adding the lead oxide or oxides desired in the paste to the mixer, subjecting the water, glass fibers and lead oxide or oxides to mixing until essentially all of the free water in the mixer has been mixed with the lead oxide or oxides, adding the rest of the water required to moisten the paste to the desired consistency and the sulfuric acid required to form the lead oxide sulfate or sulfates, and completing the mixing of the paste.

In a still further aspect, the invention is a method for producing a battery paste which consists essentially of at least one lead oxide and at least one lead oxide sulfate, from 0.02 percent to 15 percent, based on the weight of the lead oxide plus the weight of the lead oxide sulfate, calculated as the lead oxide, of glass fibers having a length to diameter ratio of at least 5:1 and an average diameter from about 0.25 micron to about 40 microns, preferably 0.25 to 30 and most desirably 0.25 to 15, and having exposed siliceous surfaces, sufficient sulfuric acid to form the desired lead oxide sulfate content and water. The method comprises charging at least a part of the water and at least a part of the glass fibers desired in the paste to a mechanical mixer, subjecting the water and fibers to mixing, adding the lead oxide or oxides desired in the paste to the mixer, subjecting the water, glass fibers and lead oxide or oxides to mixing until essentially all of the free water in the mixer has been mixed with the lead oxide or oxides, adding the rest of the water, if any, required to moisten the paste to the desired consistency and to bring the water content of the paste to from 15 to 40 percent, based upon the weight of the lead oxide plus the weight of the lead oxide sulfate, calculated as the lead oxide, charged to the mixer, and the sulfuric acid required to form the lead oxide sulfate or sulfates, and completing the mixing of the paste. It is sometimes desirable to use an excess of water, i.e., more than is desired in the paste when applied to a grid. When this is done, the invention also contemplates the removal of water from the paste, as produced, and prior to use to paste grids. A paste which contains an excess of water can be subjected to vacuum to remove the excess water, or it can be aged in contact with an atmosphere of sufficiently low humidity that moisture is removed therefrom by evaporation at ambient or slightly elevated temperature. Such a step, if it is used, can be carried out prior to the flash drying step that is carried out in the oven 22, as previously described, in which case there is a saving of energy required for flash drying.

It is also possible to use glass fibers, particulate glass having a surface area of at least 0.3 $m^2/g$, or both in a paste according to the invention, which contain, and, therefore, can impart to the paste, a specific ion to control aspects of battery plate performance. Examples of ions, which can be incorporated in the fibers and imparted to the paste in this way, include barium, antimony, cobalt, platinum, tin, bismuth, nickel, boron and the like. Example 6 illustrates the production of such a battery paste containing glass fibers and a particulate glass filler from which nickel is dissolved by the paste during service.

Example 6

A battery paste is produced by charging 525 ml water, 1.5 g ground glass and 100 g glass fibers having an average diameter of substantially 3 microns to a Hobart mixer; mixing the fibers and water for about 5 minutes by operating the mixer at 85 revolutions per minute; adding 3405 g PbO to the mixer and continuing mixing until all of the free water has been mixed with the PbO; charging 175 ml water and 38.2 g glass fibers having an average diameter of substantially 3 microns to the mixer and continuing mixing until there is a uniform paste in the mixer; charging 1.55 ml sulfuric acid containing 49 per cent of $H_2SO_4$ diluted to 155 ml with water, to the mixer and continuing mixing for 3 minutes; and charging 130 ml sulfuric acid containing 49 per cent of $H_2SO_4$ to the mixer and continuing mixing for about 10 minutes until the paste in the mixer cools to 100° F.

The glass used in Example 6 is disclosed by F. J. Williams and J. A. Orsino, supra. It is produced by melting a mixture of cp nickel carbonate, glassmaker's sand and litharge in such proportions that the molar composition is PbO 0.5 NiO $SiO_2$ at a temperature of 2600 to 2700° F., quenching the melt in water, and crushing and grinding the quenched glass. The ground glass used was all minus 200 mesh, US Sieve Series.

As is disclosed by Williams and Orsino, nickel from the ground glass used in Example 6 is dissolved slowly in a negative active material produced from the foregoing paste, about 4 percent of the nickel being dissolved after 1000 days of service. A lowering of the end-of-charge voltage and an increase in the cold capacity of batteries produced from a negative paste containing the foregoing glass were attributed by Williams and Orsino to the dissolved nickel from the glass. Batteries produced from the foregoing paste are expected to show similar improvements as a consequence of the PbO, NiO and $SiO_2$ glass therein.

Other glasses are known from which metals other than Ni, e.g., Ba, Bi, Na, Co, Pt and Sn, are dissolved slowly, and can be substituted for the Williams and Orsino glass in battery pastes according to the invention. For example, BaO, $Al_2O_3$ and $SiO_2$ form numerous compounds and various solid solutions at temperatures from 1500° C. to 1800° C. (see FIGS. 556 and 557 of Phase Diagrams for Ceramists, The American Ceramic Society, Inc., 1964); any of these compounds and solid solutions can be quenched and ground to produce a particulate material which can be added to a battery paste according to the invention, where it will constitute a source for Ba. Similarly, $Bi_2O_3$ and $Al_2O_3$ and $Bi_2O_3$ and NiO form solid solutions containing comparatively large proportions of $Bi_2O_3$ at temperatures of about 825° C. and higher (see FIGS. 326 and 327 of Phase Diagrams for Ceramists). These solid solutions can be quenched and ground to produce a particulate material which can be added to battery pastes according to the invention, where they will constitute sources for Bi and for Bi plus Ni. CoO forms solid solutions containing from about 55 to about 75 mole percent of CoO with $SiO_2$ at temperatures of 1400° C. and slightly higher (see FIG. 255 of Phase Diagrams for Ceramists) and solid solutions containing from about 55 to about 70 mole percent of CoO with $B_2O_3$ at temperatures of 1150° C. (see FIGS. 254 and 255 of Phase Diagrams for Ceramists). These solid solutions can be quenched and ground to produce particulate materials which can be added to battery pastes according to the invention, where they will constitute sources for Co. Similarly, $SnO_2$ and $Bi_2O_3$ form solid solutions containing up to about 12 mole percent of $SnO_2$ at temperatures from about 800° C. to about 1000 C. (see FIG. 328 of Phase Diagrams for Ceramists); and $SnO_2$ and BaO form solid solutions containing up to about 50 mole percent of $SnO_2$ at temperatures from about 1800° C. to a little over 2050° C. (see FIG. 212 of Phase Diagrams for Ceramists). These solid solutions can be quenched and ground to produce a particulate material which can be added to battery pastes according to the invention, where they will constitute sources for Sn and Bi and for Sn plus Ba. Those skilled in the art will appreciate that there are numerous other materials which can be added to battery pastes according to the invention to introduce advantageous metals thereto. The amount of any of these materials added to a paste should be adequate to provide the metal or metals it introduces into the paste during the lifetime of a battery made from the paste; this can be determined by the procedure described in the Williams et al. Journal article, supra.

COMPARATIVE PROCEDURE 1

In order to compare the performance in a battery paste of microglass with a tin oxide coating as suggested in the prior art with the performance of uncoated microglass, two small mixes of battery pastes were made and tested. One mix contained micro fibers that had been coated with tin oxide, while the other contained untreated glass micro fibers. The paste mixes were prepared from the following batch:

| | |
|---|---|
| Lead Oxide: | 182.0 g |
| Fiber Additive: | 11.0 g |
| Sulfuric Acid, 1.400 specific gravity: | 9.2 ml (13 g) |
| 1% Solution of Sulfuric Acid | 23.0 ml (24 g) |
| Water | 39.0 ml |
| Total Weight | 269 g |

In one batch the additive was the microglass fiber used in the foregoing Examples, diameter 3 microns, while the other batch was made with the same type of Glass Micro Fiber treated by a method described in U.S. Pat. No. 2,564,707, Aug. 21, 1951. The fibers were coated with a film of stannic tetrachloride pentahydrate. The two small paste batches were used to paste two grids and thus two pasted plates were created from the prepared active materials. Batch No. 1 was prepared using uncoated glass fibers. This paste prepared in this batch was easy to apply to the two grids. The glass micro fibers absorbed most of the water added, allowing the paste to contain a high amount of water and still be able to be pasted. The plates thus created exhibit a normal appearance of cured battery plates. The dry plate weights are as follows: Plate 1: 160.5 g and Plate 2: 161.5 g. These two plates confirm the feasibility of pasting a paste containing 6% glass micro fiber.

Batch No 2 was prepared from treated fibers. This batch did not behave in the same manner as the paste in Batch #1. The fibers did not absorb the extra water, the extra liquid was freely available and resulted in a very mushy paste that was applied with difficulty to the grids. Once cured, the plates acquired a light gray color that is not usual for a cured lead oxide plate. This gray color may be the result of the reaction of the stannic tetrachloride with sulfuric acid. Such plates including these treated fibers could not make an acceptable lead acid battery. The plate weights were as follows: Plate 1: 159.0 g and Plate 2:144.5 g In order to further characterize and distinguish the impact of the treated vs untreated fiber additions to plate paste, a plate containing each fiber type was tested for their vibration resistance. The vibration test consists in placing the plate on a plate vibrator that vibrates at a maximum amplitude of 0.1 in. and at a frequency of 50–60 Hertz for 5 minute duration. The results of the vibration test was as follows:

| | Plate #1 (Untreated Fiber) | Plate #2 (Treated Fiber) |
|---|---|---|
| Plate weights: | | |
| Before vibration | 160.1 g | 158.3 g |
| After vibration | 157.1 g | 115.4 g |
| % Loss Active Material | 1.9% | 27.1% |

The following conclusions can be drawn based upon the results of the vibration test described above. The treated fibers behave very differently at the paste preparation level. Untreated fibers quickly absorb the excess liquid added to the oxide, thus making it possible to paste a plate with extra water that once cured will give greater plate porosity. The tin oxide coated decreases the hydrophilic surface of the microglass. This ability of the microglass to hold fluid is critic to the processing of the plates. The treated fibers did not absorb any excess liquid and this led to a very mushy paste that would be impossible to run on a commercial plate making pasting process. Since the experiment hand pasted the plates, plates were still able to be constructed.

The treated fibers reacted with the components of the paste to effect the overall composition of the plate giving a grayish appearance to the plates. The key ingredient in the treatment of the fibers is a coating of tin tetrachloride pentahydrate. Vibration testing of plates made with treated and untreated fibers showed that the untreated fiber plate lost only 2% of its weight during the vibration test, whereas the treated fiber plate had a material loss of 27%.

The overall conclusion of this experiment is that the untreated glass micro fibers are suitable agents to increase the porosity of the plates. The treated fibers are not capable of performing this function, but may alter the plate in other ways, such as by increasing the electrical conductivity, but using this fiber in a commercial operation would be extremely difficult.

It will be appreciated that various changes and modifications can be made from the specific details of the invention as described above without departing from the spirit and scope thereof as defined in the following claims, and that, in one aspect, the invention is a battery paste consisting essentially of at least one lead oxide and at least one lead oxide sulfate, and sufficient water and sulfuric acid to moisten the paste, and from 0.02 percent to 15 percent based on the weight of the lead oxide plus the weight of the lead oxide sulfate, calculated as the lead oxide, of glass fibers having an average diameter from 0.25 micron to 10 microns, and having their glass surfaces in direct contact with the lead oxide, the lead oxide sulfate, the sulfuric acid and the water. Preferably, the battery paste also contains at least one additive such as an expander, flocked fibers and ground glass, contains from 1 percent by weight to 6 percent by weight of glass fibers, and the water content of the paste is from 15 to 40 percent by weight, based upon the weight of the lead oxide plus the weight of the lead oxide sulfate, calculated as the lead oxide. Optimum results have been achieved when the battery paste contained from 2 percent by weight to 4 percent by weight of glass fibers, and the water content of the paste has been from 20 to 30 percent by weight, based upon the weight of the lead oxide plus the weight of the lead oxide sulfate, calculated as the lead oxide.

In another aspect, the invention is a method for producing a battery paste which consists essentially of at least one lead oxide and at least one lead oxide sulfate, from 0.02 percent to 15 percent, based on the weight of the lead oxide plus the weight of the lead oxide sulfate, calculated as the lead oxide, of glass fibers having an average diameter from about 0.25 micron to about 10 microns, and having exposed glass surfaces, sufficient sulfuric acid to form the desired lead oxide sulfate content and sufficient water to moisten the paste, which method comprises charging at least a part of the water and at least a part of the glass fibers desired in the paste to a mechanical mixer, subjecting the water and fibers to mixing, adding the lead oxide or oxides desired in the paste to the mixer, subjecting the water, glass fibers and lead oxide or oxides to mixing until essentially all of the free water in the mixer has been mixed with the lead oxide or oxides, adding the rest of the water, if any, required to moisten the paste to the desired consistency and the sulfuric acid required to form the lead oxide sulfate or sulfates, and completing the mixing of the paste. Preferably, the water mixed with the other ingredients in producing a battery paste according to the invention constitutes from 15 to 40 percent, most desirably from 20 to 30 percent, based upon the weight of the lead oxide and lead sulfate, calculated as the oxide.

In still another aspect, the invention is a method for producing a battery plate which comprises applying to a lead grid a body of a battery paste which consists essentially of at least one lead oxide and at least one lead oxide sulfate, from 0.02 percent to 15 percent, based on the weight of the lead oxide plus the weight of the lead oxide sulfate, calculated as the lead oxide, of glass fibers having an average diameter from about 0.25 micron to about 10 microns, and having exposed glass surfaces, sufficient sulfuric acid to form the desired lead oxide sulfate content and sufficient water to moisten the paste, which method comprises charging at least a part of the water and at least a part of the glass fibers desired in the paste to a mechanical mixer, subjecting the water and fibers to mixing, adding the lead oxide or oxides desired in the paste to the mixer, subjecting the water, glass fibers and lead oxide or oxides to mixing until essentially all of the free water in the mixer has been mixed with the lead oxide or oxides, adding the rest of the water, if any, required to moisten the paste to the desired consistency and the sulfuric acid required to form the lead oxide sulfate or sulfates, and completing the mixing of the paste, and drying the paste.

In yet another aspect, the invention is a battery plate comprising a lead grid substrate embedded in a body of a cured battery paste consisting essentially of at least one lead oxide and at least one lead oxide sulfate, and from 0.02 percent to 15 percent based on the weight of the lead oxide plus the weight of the lead oxide sulfate, calculated as the lead oxide, of glass fibers having an average diameter from 0.25 micron to 10 microns, and having their glass surfaces in direct content with the lead oxide and the lead oxide sulfate. In one preferred embodiment, the battery plate has substantially parallel major surfaces and a plurality of minor surfaces extending between the major surfaces, and additionally includes a pasting paper sheet on at least one of the major surfaces, most desirably on both major surfaces. Preferably, the pasting paper sheet(s) is/are substantially coextensive with the major surface(s) of the battery plate. In another preferred embodiment, there is from about 0.1 percent to about 1 percent of a flocked fiber filler dispersed in the battery paste. A battery plate which consists essentially of the grid embedded in the cured battery paste is also a preferred embodiment.

In a further aspect the invention is an electrochemical cell comprising a plurality of spaced, parallel battery plates each of which comprises a grid embedded in a body of a cured battery paste consisting essentially of at least one lead oxide and at least one lead oxide sulfate, and from 0.02 percent to 15 percent based on the weight of the lead oxide plus the weight of the lead oxide sulfate, calculated as the lead oxide, of glass fibers having an average diameter from 0.25 micron to 10 microns, and having their glass surfaces in direct content with the lead oxide and the lead oxide sulfate, a separator between adjacent ones of said plates, an electrolyte in contact with the major surfaces of said plates, positive and negative battery posts, and electrical connectors operably connecting said battery posts and said plates.

In yet another aspect, the invention is a method for producing a battery paste which consists essentially of at least one lead oxide and at least one lead oxide sulfate, from 0.02 percent to 15 percent, based on the weight of the lead oxide plus the weight of the lead oxide sulfate, calculated as the lead oxide, of a siliceous filler having a surface area of at least 0.3 $m^2/g$, and having exposed siliceous surfaces, sufficient sulfuric acid to form the desired lead oxide sulfate content and sufficient water to moisten the paste, which method comprises charging a part of the water and a part of the glass fibers desired in the paste to a mechanical mixer, subjecting the water and fibers to mixing, adding the lead oxide or oxides desired in the paste to the mixer, subjecting the water, glass fibers and lead oxide or oxides to mixing until essentially all of the free water in the mixer has been mixed with the lead oxide or oxides, adding the rest of the water required to moisten the paste to the desired consistency and the sulfuric acid required to form the lead oxide sulfate or sulfates, and completing the mixing of the paste.

In still a further embodiment, the invention is a battery plate assembly comprising first and second battery plates, each of which comprises a grid embedded in a body of a cured battery paste consisting essentially of at least one lead oxide and at least one lead oxide sulfate, and from 0.02 percent to 15 percent based on the weight of the embodiment, there is from about 0.1 percent to about 1 percent of a flocked fiber filler dispersed in the battery paste. A battery plate which consists essentially of the grid embedded in the cured battery paste is also a preferred embodiment.

In a further aspect the invention is an electrochemical cell comprising a plurality of spaced, parallel battery plates each of which comprises a grid embedded in a body of a cured battery paste consisting essentially of at least one lead oxide and at least one lead oxide sulfate, and from 0.02 percent to 15 percent based on the weight of the lead oxide plus the weight of the lead oxide sulfate, calculated as the lead oxide, of glass fibers having an average diameter from 0.25 micron to 10 microns, and having their glass surfaces in direct content with the lead oxide and the lead oxide sulfate, a separator between adjacent ones of said plates, an electrolyte in contact with the major surfaces of said plates, positive and negative battery posts, and electrical connectors operably connecting said battery posts and said plates.

In yet another aspect, the invention is a method for producing a battery paste which consists essentially of at least one lead oxide and at least one lead oxide sulfate, from 0.02 percent to 15 percent, based on the weight of the lead oxide plus the weight of the lead oxide sulfate, calculated as the lead oxide, of a siliceous filler having a surface area of at least 0.3 m$^2$/g, and having exposed siliceous surfaces, sufficient sulfuric acid to form the desired lead oxide sulfate content and sufficient water to moisten the paste, which method comprises charging a part of the water and a part of the glass fibers desired in the paste to a mechanical mixer, subjecting the water and fibers to mixing, adding the lead oxide or oxides desired in the paste to the mixer, subjecting the water, glass fibers and lead oxide or oxides to mixing until essentially all of the free water in the mixer has been mixed with the lead oxide or oxides, adding the rest of the water required to moisten the paste to the desired consistency and the sulfuric acid required to form the lead oxide sulfate or sulfates, and completing the mixing of the paste.

In still a further embodiment, the invention is a battery plate assembly comprising first and second battery plates, each of which comprises a grid embedded in a body of a cured battery paste consisting essentially of at least one lead oxide and at least one lead oxide sulfate, and from 0.02 percent to 15 percent based on the weight of the lead oxide plus the weight of the lead oxide sulfate, calculated as the lead oxide, of glass fibers having an average diameter from 0.25 micron to 10 microns, and having their glass surfaces in direct content with the lead oxide and the lead oxide sulfate: The first battery plate has first and second, opposed, major surfaces and the cured battery paste in which the lead grid is embedded is a positive active material. The second battery plate has first and second, opposed, major surfaces, and the cured battery paste in which the lead grid is embedded is a negative active material. The first of the opposed major surfaces of the first battery plate is in spaced, opposed relationship with the second of the opposed major surfaces of the second battery plate, and there is a separator between the first of the opposed major surfaces of the first battery plate and the second of the opposed major surfaces of the second battery plate. In one embodiment, the first and second battery plates of the battery plate assembly are wound together into a coil. In another embodiment, the first and second battery plates of the battery plate assembly are stacked into a prismatic configuration.

In general, microglass fibers that are used in practicing the instant invention can be made by any of the usual processes, so long as they have diameters which fall within the limits specified. Fibers having the requisite diameters can be produced by the rotary and flame blown processes, and by the CAT process, which is illustrated in U.S. Pat. No. 5,076,826. It is usually preferred that the fibers be not longer than about one half inch, preferably not longer than about one quarter inch. Indeed, milled fibers are also operable, as are mixtures of glass fibers and particulate siliceous materials. Indeed, many of the advantages of the instant invention can be achieved in a battery paste consisting essentially of at least one lead oxide and at least one lead oxide sulfate, sulfuric acid, from 15 to 40 percent of water, and from 0.02 percent to 15 percent based on the weight of the lead oxide plus the weight of the lead oxide sulfate, calculated as the lead oxide, of a particulate siliceous material having an average surface area of at least 0.3 m$^2$ per gram, and having their siliceous surfaces in direct contact with the lead oxide, the lead oxide sulfate, the sulfuric acid and the water.

Many of the advantages of the instant invention can also be achieved in a battery paste consisting essentially of at least one lead oxide and at least one lead oxide sulfate, sulfuric acid, from 15 to 40 percent of water, and from 0.02 percent to 15 percent based on the weight of the lead oxide plus the weight of the lead oxide sulfate, calculated as the lead oxide, of a mixture of glass fibers having an average diameter from 0.25 micron to 10 microns and a particulate siliceous material having an average surface area of at least 0.3 m$^2$ per gram, the glass fibers and the particulate siliceous material having their siliceous surfaces in direct contact with the lead oxide, the lead oxide sulfate, the sulfuric acid and the water. However, optimum results have been achieved when the paste has consisted essentially of at least one lead oxide and at least one lead oxide sulfate, sulfuric acid, from 15 to 40 percent of water, and from 0.02 percent to 15 percent based on the weight of the lead oxide plus the weight of the lead oxide sulfate, calculated as the lead oxide, of glass fibers having an average diameter from 0.25 micron to 10 microns and a length to diameter ratio of at least 5, the glass fibers having their siliceous surfaces in direct contact with the lead oxide, the lead oxide sulfate, the sulfuric acid and the water.

There is a need to find a use for separator reclaimed from scrap batteries. Such separator, when composed of glass fibers, is an excellent source for glass fibers in a battery paste according to the instant invention. Accordingly, in one aspect, the instant invention is a method for producing a battery paste which consists essentially of at least one lead oxide and at least one lead oxide sulfate, from 0.02 percent to 15 percent, based on the weight of the lead oxide plus the weight of the lead oxide sulfate, calculated as the lead oxide, of glass fibers having an average diameter from about 0.25 micron to about 10 microns, and having exposed glass surfaces, sufficient sulfuric acid to form the desired lead oxide sulfate content and sufficient water to moisten the paste, which method comprises recovering glass fiber separator from scrap batteries, charging at least a part of the water and recovered glass fibers as at least a part of the glass fibers desired in the paste to a mechanical mixer, subjecting the water and fibers to mixing, adding the lead oxide or oxides desired in the paste to the mixer, subjecting the water, glass fibers and lead oxide or oxides to mixing until essentially all of the free water in the mixer has been mixed with the lead oxide or oxides, adding the rest of the water, if any, required to moisten the paste to the desired consistency, any additional glass fibers required, and the consistency, any additional glass fibers required, and the sulfuric acid required to form the lead oxide sulfate or sulfates, and completing the mixing of the paste.

We claim:

1. A battery plate comprising:
   a lead grid embedded in a dried body of a battery paste; and
   a pasting paper sheet, wherein before being dried, the battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, before being dried, the battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste, and the battery plate has substantially parallel major surfaces and a plurality of minor surfaces extending between said major surfaces, and the pasting paper sheet is on at least one of said major surfaces.

2. A battery plate as claimed in claim 1 wherein the pasting paper sheet is substantially coextensive with said major surface.

3. A battery plate as claimed in claim 2 which has substantially parallel major surfaces and a plurality of minor surfaces extending between said major surfaces, and which additionally includes a pasting paper sheet on both of said major surfaces.

4. A battery plate as claimed in claim 1 wherein said pasting paper sheet is a sheet of cellulosic fibers.

5. A battery plate as claimed in claim 1 wherein said pasting paper sheet is a sheet of glass fibers.

6. A battery plate assembly comprising:
   a first battery plate, comprising a first lead grid embedded in a dried body of a first battery paste, wherein before being dried, the first battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and, before being dried, the first battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste;
   a second battery plate, comprising a second lead grid embedded in a dried body of a second battery paste, wherein before being dried, the second battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and, before being dried, the second battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste; and
   a separator, wherein the first battery plate has first and second, opposed, major surfaces, the second battery plate has first and second, opposed, major surfaces, the first of the opposed major surfaces of the first battery plate is in spaced, opposed relationship with the second of the opposed major surfaces of the second battery plate, the separator is between the first of the opposed major -surfaces of the first battery plate and the second of the opposed major surfaces of the second battery plate, and said first and second battery plates are wound together into a spiral.

7. A battery plate assembly comprising:
   a first battery plate, comprising a first lead grid embedded in a dried body of a first battery paste, and a pasting paper sheet wherein before being dried, the first battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and, before being dried, the first battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste;
   a second battery plate, comprising a second lead grid embedded in a dried body of a second battery paste, wherein before being dried, the second battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and, before being dried, the second battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste; and
   a separator, wherein the first battery plate has first and second, opposed, major surfaces, the second battery plate has first and second, opposed, major surfaces, the first of the opposed major surfaces of the first battery plate is in spaced, opposed relationship with the second of the opposed major surfaces of the second battery plate, the separator is between the first of the opposed major surfaces of the first battery plate and the second of the opposed major surfaces of the second battery plate, and said first and second battery plates constitute a tubular assembly.

8. A battery plate assembly comprising:
   a first battery plate, comprising a first lead grid embedded in a dried body of a first battery paste, and a pasting paper sheet wherein before being dried, the first battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and, before being dried, the first battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste; and a second battery plate, comprising a second lead grid embedded in a dried body of a second battery paste, wherein before being dried, the second battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and, before being dried, the second battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste; and a separator, wherein the first battery plate has first and second, opposed, major surfaces, the second battery plate has first and second, opposed, major surfaces, the first of the opposed major surfaces of the first battery plate is in spaced, opposed relationship with the second of the opposed major surfaces of the second battery plate, the separator is between the first of the opposed major surfaces of the first battery plate and the second of the opposed major surfaces of the second battery plate, and said first and second battery plates are stacked in a prismatic configuration.

9. A battery plate comprising:

a lead grid embedded in a dried body of a battery paste, wherein before being dried, the battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, before being dried, the battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste, and there is from about 0.1 percent to about 1 percent of a flocked fiber filler dispersed in said dried battery paste.

10. A battery plate consisting essentially of:

a lead grid embedded in and pasted with a dried body of a battery paste, and a pasting paper sheet wherein before being dried, the battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and before being dried, the battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste.

11. An electrochemical cell comprising:

a plurality of spaced apart battery plates, each of the battery plates comprising a lead grid embedded in a dried body of a battery paste, and a pasting paper sheet wherein before being dried, the battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and before being dried, the battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste;

a separator between adjacent ones of said plates;

an electrolyte in contact with major surfaces of said plates;

positive battery posts;

negative battery posts; and electrical connectors operably connecting said battery posts and said plates, wherein the electrochemical cell is a valve regulated lead acid battery.

12. A valve regulated lead acid battery as claimed in claim 11 with a separator which is a glass mat in which the electrolyte is absorbed.

13. A valve regulated lead acid battery as claimed in claim 11 which has a gelled electrolyte.

14. An electrochemical cell comprising:

a plurality of spaced apart battery plates, each of the battery plates comprising a lead grid embedded in a dried body of a battery paste, wherein before being dried, the battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and before being dried, the battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste;

a separator between adjacent ones of said plates;

an electrolyte in contact with major surfaces of said plates;

positive battery posts;

negative battery posts; and electrical connectors operably connecting said battery posts and said plates, wherein
said battery plates are coiled to form a spiral wound cell.

15. An electrochemical cell comprising:

a plurality of spaced apart parallel battery plates, each of the battery plates comprising a lead grid embedded in a dried body of a battery paste, and a pasting paper sheet wherein before being dried, the battery paste consists essentially of at least one lead oxide, at least one lead sulfate, sufficient water to moisten the paste, sufficient sulfuric acid to moisten the paste and form the desired lead sulfate, and from 1 percent to 6 percent, based on the weight of the lead oxide plus the weight of the lead sulfate, calculated as the lead oxide, of glass fibers having an average diameter of from 0.25 micron to 10 microns and having their glass surfaces in direct contact with the lead oxide, and before being dried, the battery paste is prepared by a method that comprises charging the water, the lead oxide or oxides, in the proportions desired in the paste, and the glass fibers to a mechanical mixer, subjecting the water, lead oxide or oxides and glass fibers to mixing, adding the sulfuric acid required to form the lead sulfate, and completing the mixing of the paste;

a separator between adjacent ones of said plates;

an electrolyte in contact with major surfaces of said plates;

positive battery posts;

negative battery posts; and electrical connectors operably connecting said battery posts and said plates.

* * * * *

UNITED STATES PATENT AND TRADEMARK OFFICE
CERTIFICATE OF CORRECTION

PATENT NO. : 6,531,248 B1
DATED : March 11, 2003
INVENTOR(S) : George C. Zguris and Antonio L. Ferreira It is certified that error appears in the above-identified patent and that said Letters Patent is hereby corrected as shown below:

Title page,
Item [*] Notice, replace "134 days" with -- 216 days --.
Item [56], OTHER PUBLICATIONS, insert -- U.S. patent application publication No. US2001/004662 --.
U.S. PATENT DOCUMENTS, replace "3/1990" with -- 3/1995 --.
FOREIGN PATENT DOCUMENTS, replace "1 572 233" with -- 1 572 333 --; and replace the date "2/1983" in connection with foreign patent number "58035867" with -- 3/1983 --.

Column 23,
Line 67, delete "-" between "major" and "surfaces".

Column 24,
Line 6, delete "," after "paste".
Line 7, after "sheet" insert -- ; --.
Lines 56-57, after "paste" delete "," and after "sheet" insert -- ; --.

Column 25,
Line 60, after "paste" delete "," and after "sheet" insert -- ; --.

Column 26,
Line 12, after "paste" delete "," and after "sheet" insert -- ; --.

Column 27,
Lines 13-14, after "paste" delete "," and after "sheet" insert -- ; --.

Signed and Sealed this

Sixteenth Day of December, 2003

JAMES E. ROGAN
*Director of the United States Patent and Trademark Office*